United States Patent
Wetzel et al.

(10) Patent No.: US 6,408,004 B1
(45) Date of Patent: Jun. 18, 2002

(54) ADSL DUAL LATENCY DETERMINATION

(75) Inventors: Jacqueline M. Wetzel, Richardson; William C. Timm, McKinney, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/203,777

(22) Filed: Dec. 2, 1998

Related U.S. Application Data

(60) Provisional application No. 60/069,129, filed on Dec. 4, 1997.

(51) Int. Cl.[7] .............................................. H04L 12/56
(52) U.S. Cl. .................................................. 370/395.6
(58) Field of Search ................................ 370/254, 351, 370/352, 395, 389, 216, 218, 219, 227, 228, 464, 465, 474, 399, 503, 350, 395.2, 395.31, 395.52, 395.53, 395.6, 395.61, 395.62; 340/825.01, 825.03, 825.5, 825.51, 825.52, 827; 379/221, 93.06, 93.15, 93.21, 93.31

(56) References Cited

U.S. PATENT DOCUMENTS 5,666,487 A * 9/1997 Goodman et al. .......... 370/395
6,195,697 B1 * 2/2001 Bowman-Amuah ......... 370/252

* cited by examiner

Primary Examiner—Dang Ton
(74) Attorney, Agent, or Firm—Pedro P. Hernandez; W. James Brady III; Frederick J. Telecky, Jr.

(57) ABSTRACT

A method and system for controlling data latency in a communication network use a pre-selected portion of the data to identify one of at least two latency paths. The data is transported to a network device (500) through physical channel (502). The network device (500) includes at least two latency paths (506,508), each operable to transport the data through to other parts of the device (500) at an associated rate. In a first aspect of the present invention, data sorter (504) extracts a latency path identifier from the incoming data then provides the incoming data to one of the at least two latency paths (506,508) accordingly. In another aspect of the present invention, the data sorter (504) extracts a indicator from the incoming data which characterizes the incoming data, decodes the indicator to determine which of the at least two latency paths (506,508) to selects, then provides the incoming data to the selected one of the at least two latency paths (506,508). An interleaving device (510) may be included in a selected one of the data paths (512). The at least two latency paths (506,508) transport the data to multiplexer (514) where the data is recombined for further transport to other portions of the device (500) through path (516).

2 Claims, 5 Drawing Sheets

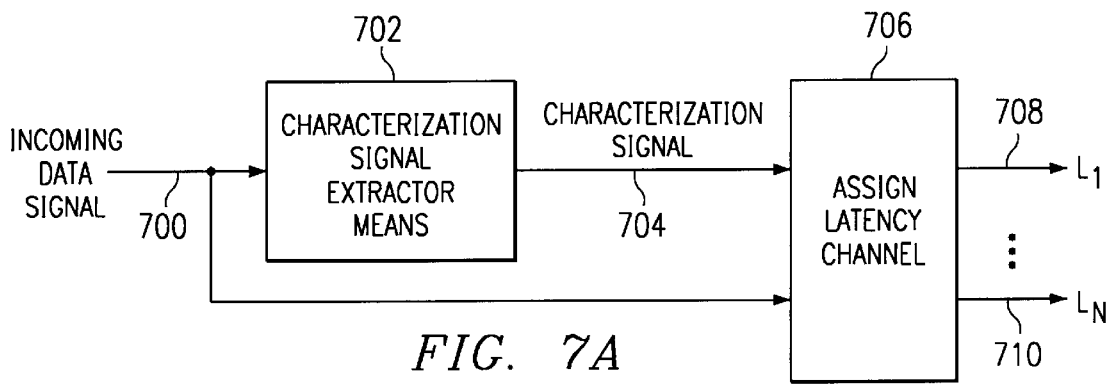
FIG. 7A
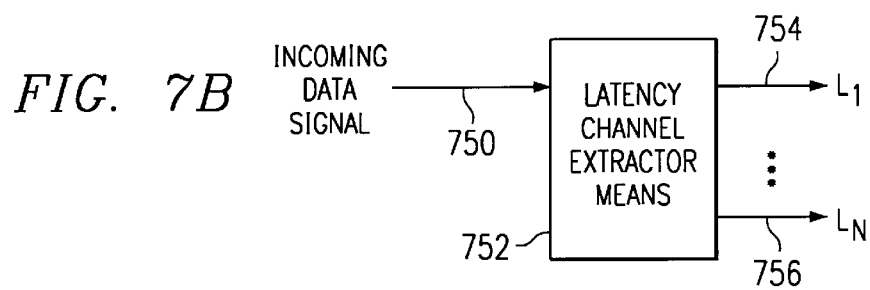
FIG. 7B
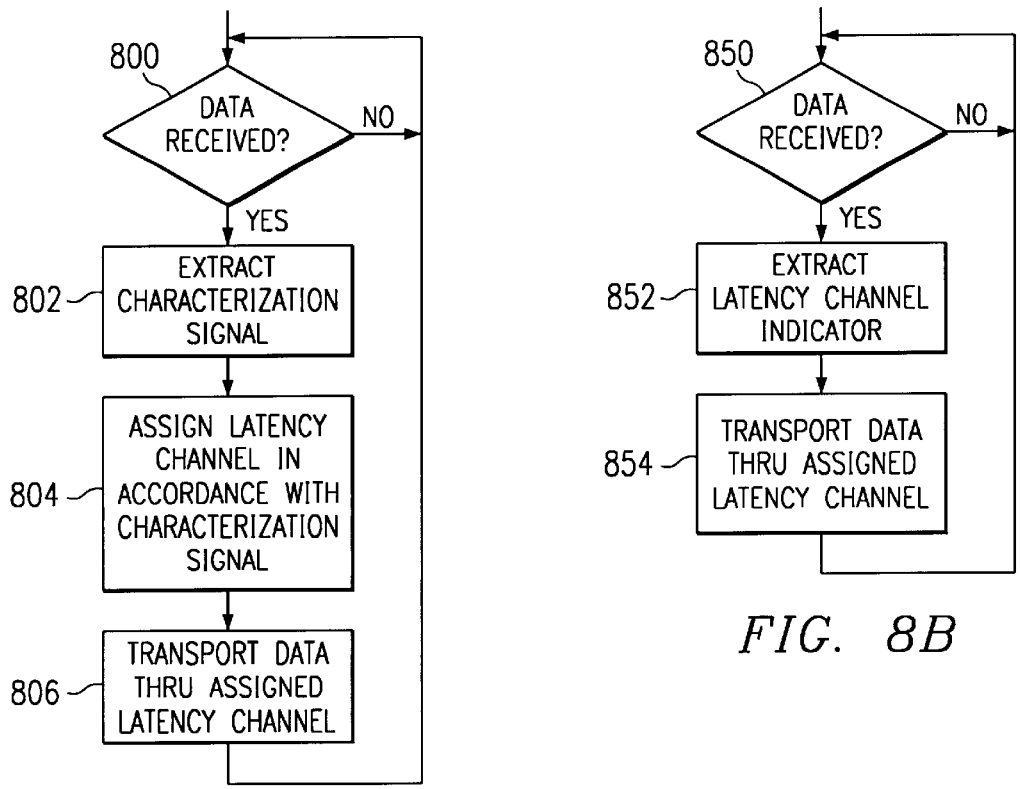
FIG. 8A
FIG. 8B

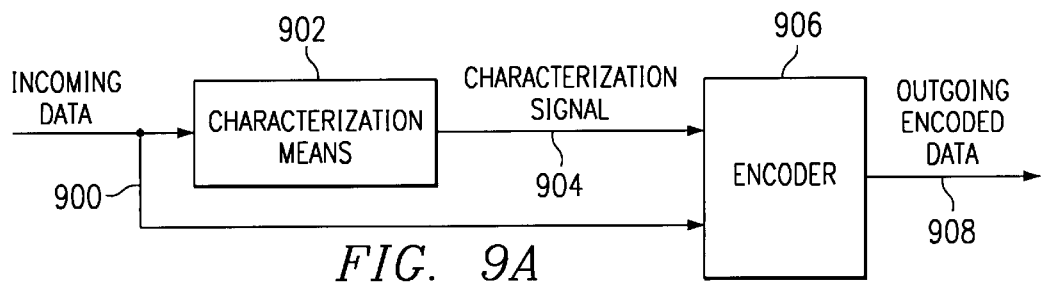
FIG. 9A
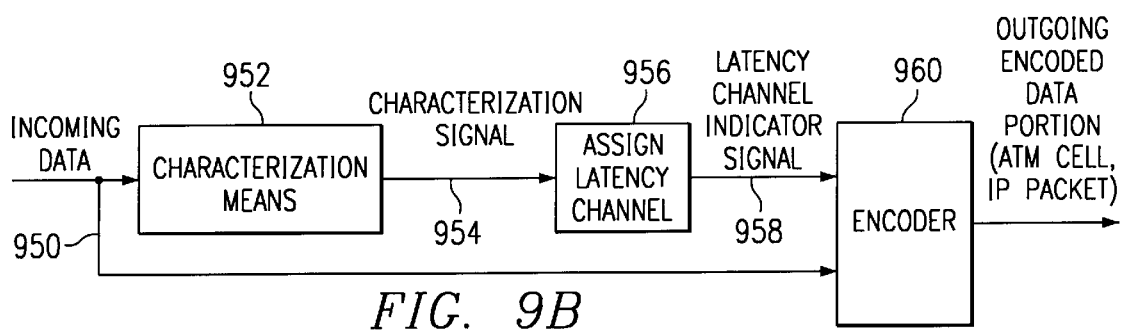
FIG. 9B
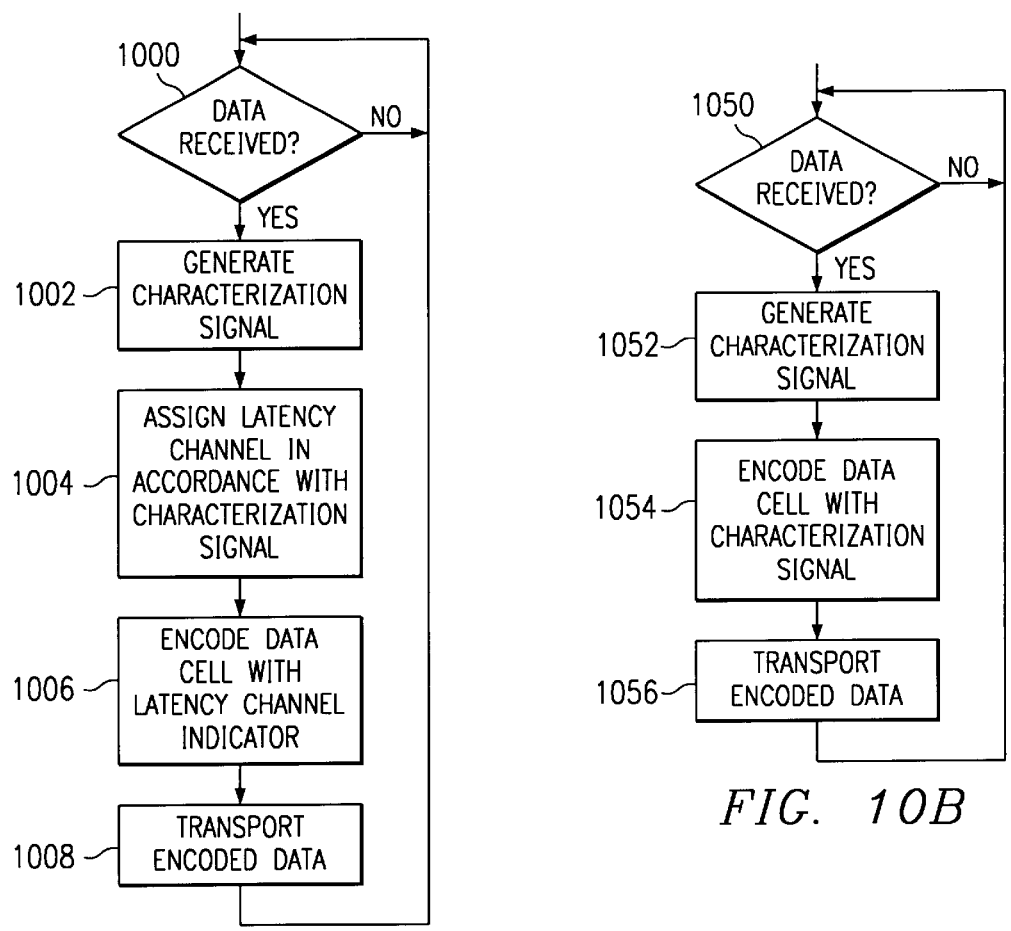
FIG. 10A
FIG. 10B

ADSL DUAL LATENCY DETERMINATION

This amendment claims priority under 35 USC § 119(e)(1) of provisional application No. 60/069,129, filed Dec. 04, 1997.

TECHNICAL FIELD OF THE INVENTION

This invention relates generally to communications systems and in particular to transmitting ATM (Asynchronous Transfer Mode) cells over ADSL (Asymmetric Digital Subscriber Line).

BACKGROUND OF THE INVENTION

ADSL is a newly standardized transmission technology facilitating simultaneous use of normal telephone services, one-way data transmission of six of up to eight (8) Mbits/s in the downstream and full duplex data transmission at up to 800 Kbits/s in the upstream channel. ADSL can be seen as a FDM (Frequency-Division Multiplexing) system in which the available bandwidth of a single copper-loop is divided into three parts. Passive filters are used to split POTS (Plain Ordinary Telephone Service) from the data channels to guarantee POTS service in case of ADSL system failure.

The decomposed and routed data from the access module is connected to an ATU-C (ADSL Transceiver Unit—Central Office) where the data is converted into analog signals. The analog signals are then carried with the POTS signals to the remote end. The ATU-C also receives and decodes data coming from customers premises send by ATU-R (ADSL Transceiver Unit—Remote Terminal).

Currently the ADSL standard specifies one path for all traffic. However, different traffic types (i.e., video traffic) requires faster processing than other traffic (i.e., data and e-mail). This could be interpreted as requiring two physical interfaces on the ADSL modem. Having two physical interfaces, however, increases the number of pins needed to support traffic, i.e., ATM traffic, over ADSL and thus potentially increases the complexity and expense of the implementation.

What is needed is a straightforward method to determine which latency path a particular data cell uses.

SUMMARY OF THE INVENTION

A method and system for controlling data latency in a communication network use a pre-selected portion of the data to identify one of at least two latency paths. The data is transported to a network device 500 through physical channel 502. The network device 500 includes at least two latency paths 506,508 each operable to transport the data through to other parts of the device 500 at an associated rate. In one aspect of the invention, data sorter 504 extracts a latency path identifier from the incoming data then provides the incoming data to the identified one of the at least two latency paths 506,508 accordingly. In another aspect of the present invention, the data sorter 504 extracts from the incoming data an indicator which characterizes the incoming data, decodes the characteristic indicator to determine which of the at least two latency paths 506,508 to select, then provides the incoming data to the selected one of the at least two latency paths 506,508. An interleaving device 510 may be included in a selected one of the data paths 512. The at least two latency paths 506, 508 transport the data to multiplexer 514 where the data is recombined for further transport to other portions of the device 500 through path 516.

These and other features of the invention that will be apparent to those skilled in the art from the following detailed description of the invention, taken together with the accompanying drawings.

DESCRIPTION OF THE DRAWINGS

FIGS. 7A and 7B show block diagrams of a first and second embodiment, respectively, of a data sorter during reception of data in accordance with the present invention;

FIGS. 8A and 8B are flow diagrams illustrating operation of the first and second embodiments, respectively, of the data sorter during transmission of data in accordance with the present invention;

FIGS. 9A and 9B show block diagrams of a first and second embodiment, respectively, of a data sorter during reception of data in accordance with the present invention; and FIGS. 10A and 10B are flow diagrams illustrating operation of the first and second embodiments, respectively, of the data sorter during transmission of data in accordance with the present invention.

DETAILED DESCRIPTION OF THE INVENTION

Figure 1:
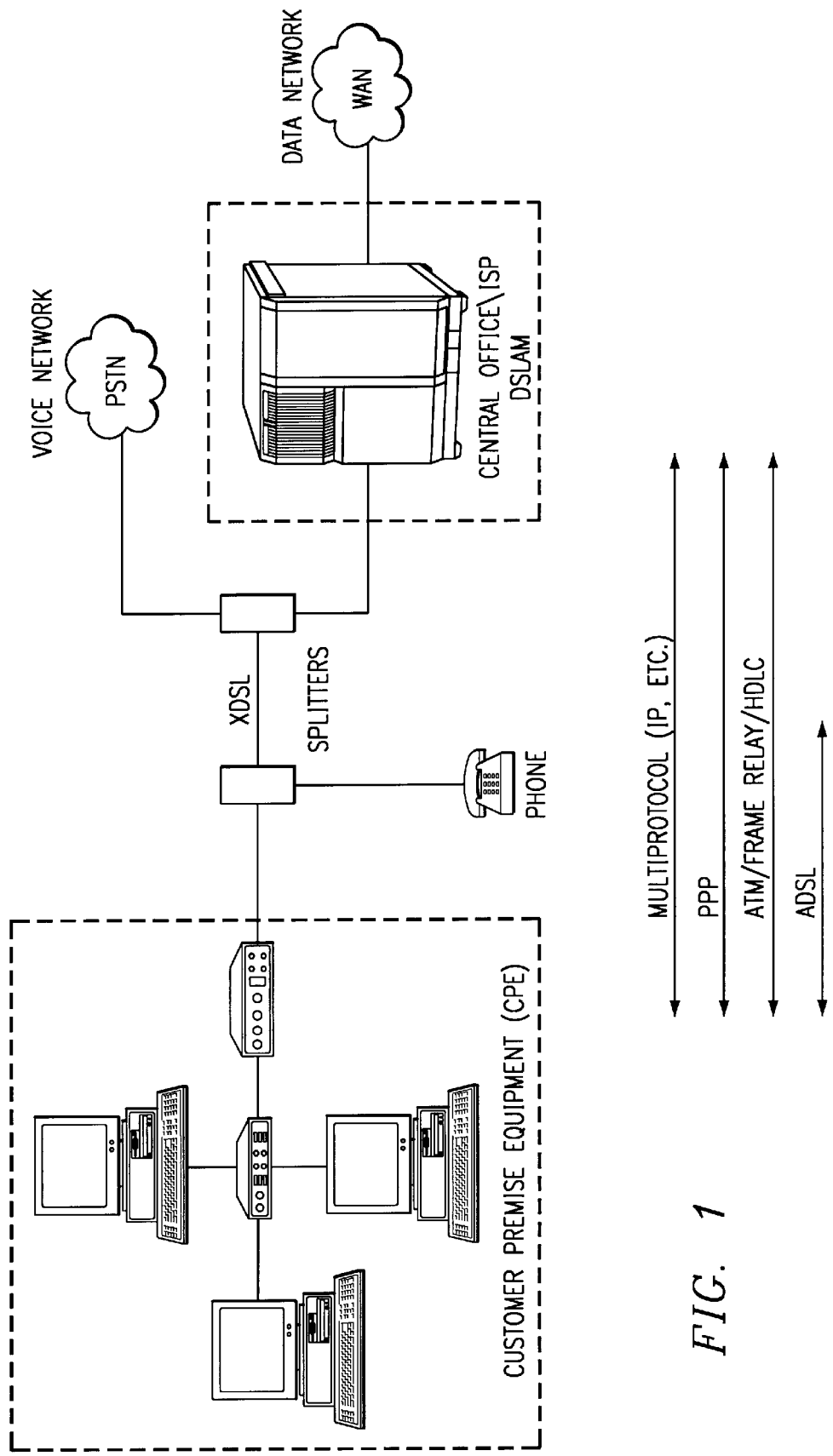
FIG. 1 depicts an end-to-end communications system architecture supporting a multi-service model.

FIG. 1 depicts an end-to-end communications system architecture supporting a multi-service model which could benefit from the present invention.

Figure 2:
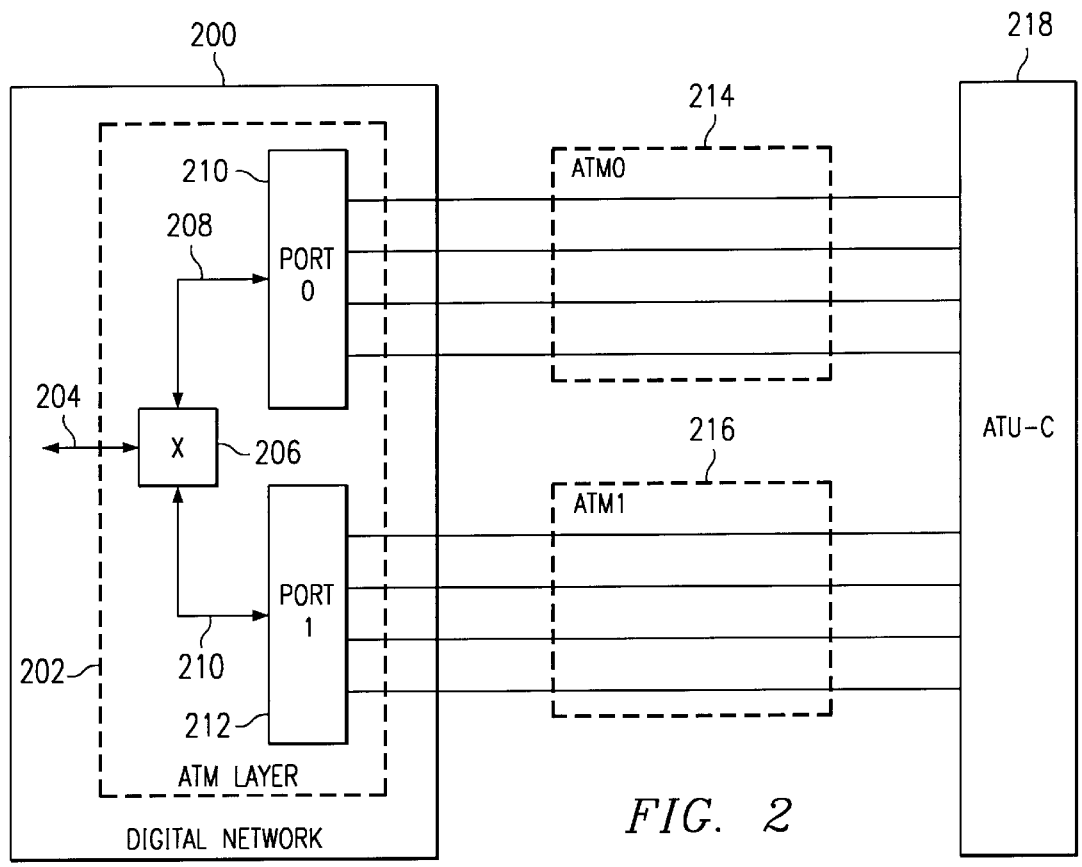
FIG. 2 shows a prior art communications system with multiple physical connections between a digital network and a central office transceiver unit.

For the transport of ATM over Asymmetrical Digital Subscriber Line (ADSL), the current ATM Forum T1.413 Issue 2 draft specification shows one interfaces for the fast and slow data paths. If a designer wishes to insure that certain traffic (i.e., video, data or e-mail) traffic is processed first, this can be interpreted as requiring two separate physical interfaces. This dual port structure is illustrated in FIG. 2 which shows two physical connections 214 and 216 between the digital network 200 and the central office ADSL transceiver unit (ATU-C) 218. The two physical connections 214 and 216 are used to transmit information from port0 210 and port1 212 in an ATM layer 202 of the digital network 200. Multiplexer 206 is used to multiplex information received from the two ports 210 and 212 through paths 208 and 210, respectively, for transport to other portions of the digital network 200 through path 204.

Figure 3:
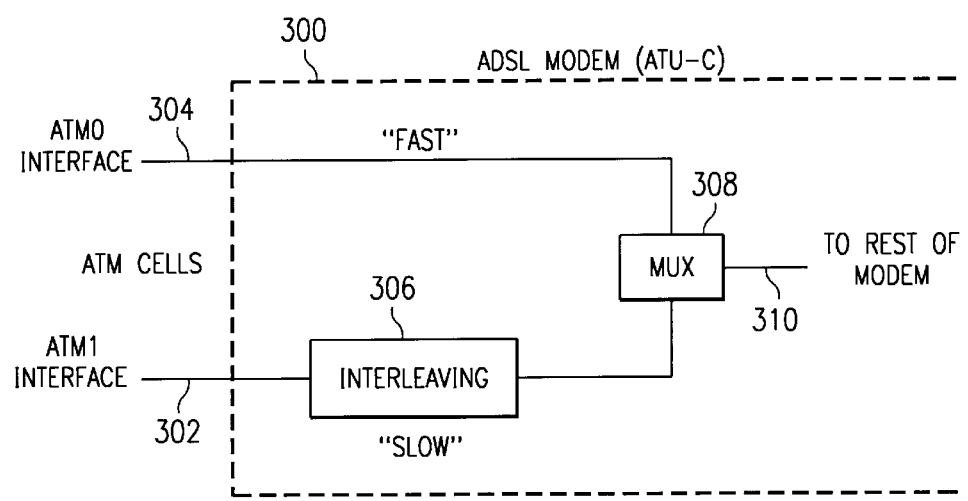
FIG. 3 is a detailed block diagram of the central office transceiver.

FIG. 3 is a detailed block diagram of the central office ADSL transceiver unit (ATU-C) or ADSL modem 300. The ADSL modem 300 includes two latency paths, one labeled "fast" and the other labeled "slow" which are accessed through two physical ATM interfaces 302 and 304. The "slow" latency path also includes an interleaving device 306. The fast and slow interfaces 304 and 302, respectively, enter the ADSL modem 300 on separate paths and are multiplexed together by multiplexer 308 before entering the rest of the modem 300 for further processing through path 310. The use of two separate physical interface results in increased pin count which increases the cost of the silicon used in implementing the device.

Figure 4:
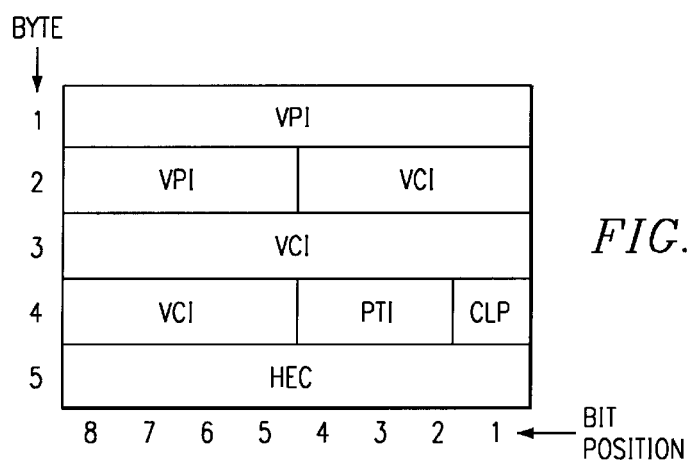
FIG. 4 depicts an ATM cell header structure.

FIG. 4 depicts an ATM cell header structure which consists of five (5) bytes. As illustrated in FIG. 4, the first byte includes virtual path identifier (VPI) bits. The second byte includes VPI bits and virtual channel identifier (VCI) bits. The third byte includes VCI bits. The fourth byte includes VCI bits, payload type indicator (PTI) bits, and cell loss priority (CLP) bits. The fifth byte of the ATM cell header includes header error control (HEC) bits. Currently, the ATM Forum specification describes use of the PTI bits to indicate the different cell payload types, such as resource management (RM), in the current traffic management. In the preferred embodiment of the present invention, the PTI bits are used to provide information which pre-select or is used in determining which of at least two latency paths the related ATM cell data is to use.

Figure 5:
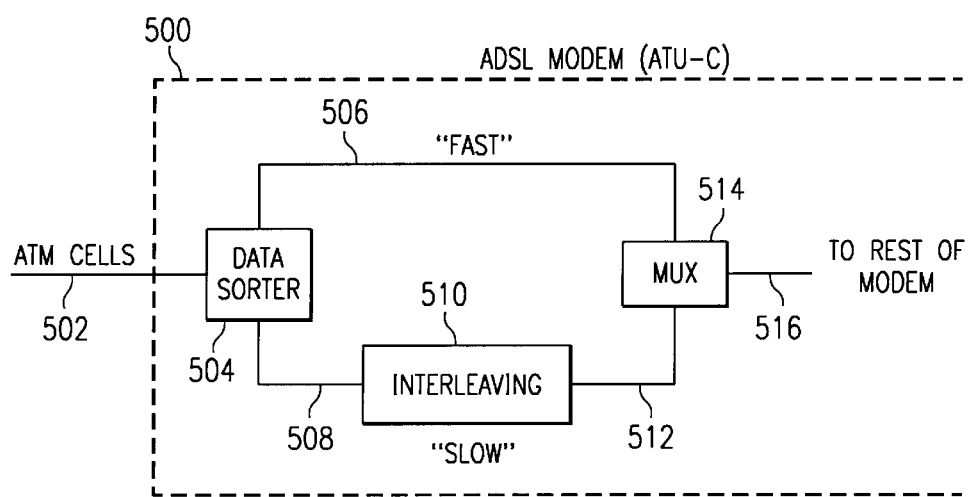
FIG. 5 shows a block diagram of a communications system with a single physical connection between the digital network and the central office transceiver in accordance with the present invention.

FIG. 5. is a detailed block diagram of a portion of the central office ADSL transceiver unit (ATU-C) in accordance with the present invention. The data, in this case ATM cells, is transported to the ADSL modem 500 through physical connection 502. The ADSL modem 500 includes at least two latency paths 506,508, each operable to transport the data through to other parts of the ADSL modem 500 at an associated rate.

In the preferred embodiment of the present invention, the data sorter 504 extracts the latency path identifier from the incoming data then provides the incoming data to one of the at least two latency paths (506,508) accordingly. In this case, pre-selected bits of the ATM cell header, i.e., the PTI bits are coded with the latency path identifier.

In another aspect of the present invention, the data sorter (504) extracts the identifier from the incoming data, then decodes the identifier to determine which of the at least two latency paths (506,508) to selects. In this case, the identifier provides information which the data sorter 504 uses in determining which of the at least two latency paths 506,508 to select. The identifier may, for example, identify characteristics of the data included in the incoming data cell, i.e., whether the data is voice data, e-mail, etc. Based on the identified characteristics, the data sorter 504 then determines which of the at least two latency paths to provides the incoming data to and then provides the incoming data to the selected one of the at least two latency paths 506,508.

As shown in FIG. 5, an interleaving device 510 may be included in a selected one of the data paths 512. The at least two latency paths 506, 508 transport the data to multiplexer 514 where the data is recombined for further transport to other portions of the ADSL modem 500 through path 516.

Figure 6:
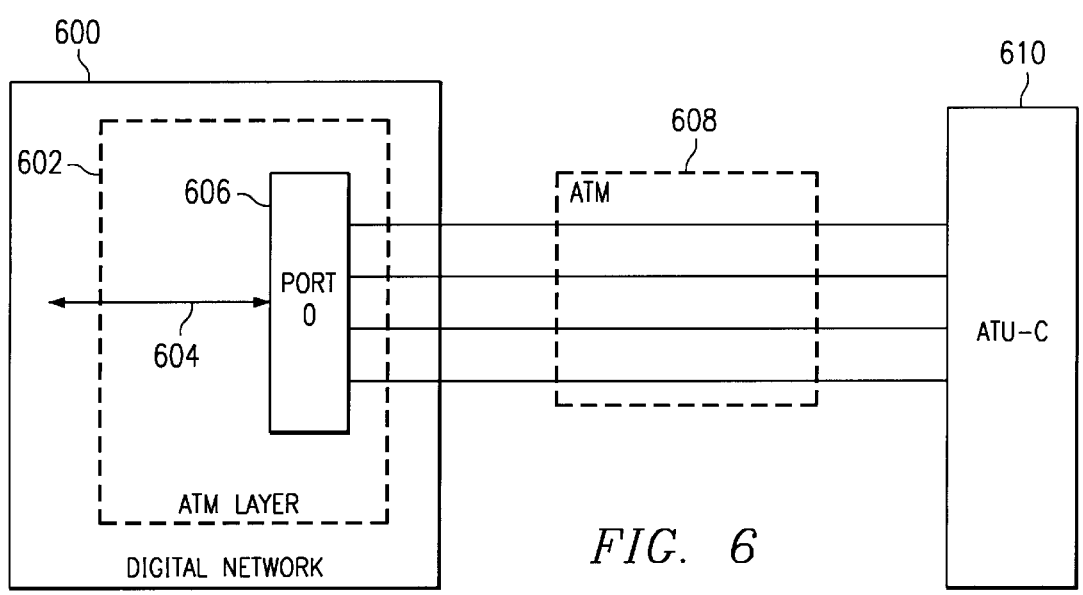
FIG. 6 is a detailed block diagram of a portion of the central office transceiver unit in accordance with the present invention.

FIG. 6 shows a block diagram of a portion of a communications system with a single physical connection 502 between the digital network 600 and the ATU-C 610 for transporting ATM data 608 in accordance with the present invention.

FIGS. 7A and 7B show block diagrams of a first and second embodiment, respectively, of the data sorter 504 in accordance with the present invention during reception of data into the ADSL modem 500.

In FIG. 7A, characterization signal extractor means 702 accepts as input incoming ATM cell data signals from communications path 502. The characterization identifier which is stored in the header of the ATM cell is extracted in response and used by the assign latency channel means 706 to determine which of at least two latency paths 708, 710 the data is to be further transported. It is contemplated that the PTI bits are used to store the characterization identifier in the ATM cell header but other portions of the ATM cell header may be used as well. The characterization extractor means 702 generates a characterization signal in response which is sent to the assign latency channel means 706. The assign latency channel means 706 uses the characterization signal to determine which of at least two latency paths 708, 710 the data should be transported to other parts of the ADSL modem. The characterization signal may indicate for example, that the incoming ATM data is voice data, in which case the assign latency channel means 706 assigns that data to the fastest of the at least two latency paths 708, 710.

FIG. 7B the data sorter 504 includes latency channel extractor means 752 which extracts the latency channel identifier directly from the header of the incoming ATM cell data then further transports the ATM cell data to other parts of the device through the identified one of the at least two latency paths 754, 756.

FIGS. 8A and 8B are flow diagrams illustrating operation of the first and second embodiments of the data sorter 504 in reception mode in accordance with the present invention.

As shown in FIG. 8A at decision block 800, if data is received, operation continues to block 802 where the characterization signal is extracted from the header of the incoming ATM cell data. Operation then continues at block 804 where a latency channel is assigned to the incoming ATM cell data in accordance with the characterization signal. Then, as shown at block 806, the incoming data is then transported through the assigned latency channel.

FIGS. 9A and 9B show block diagrams of a first and second embodiment, respectively, of the data sorter 504 during transmission mode in accordance with the present invention.

In FIG. 9A, data received from other parts of the device through path 900 is input into characterization means 902 which characterizes the data according, for example, to the content of the data. The characterization signal could be used to indicate that the data was voice, text, e-mail, etc. The characterization signal could also be used to indicate the source of the data, i.e., from a video camera, telephone, etc. Encoder means 906 then encodes the ATM cell header, which is provided to the encoder means 906 through path 900, with the characterization signal before transporting the ATM cell through path 908. As discussed hereinabove, the PTI bits of the ATM cell header are encoded with the characterization signal but other portions of the ATM cell header may be used to carry the characterization information as well.

FIG. 9B illustrates the second embodiment of the data sorter 504 during transmission mode in accordance with the present invention. As shown in FIG. 9B, characterization means 952 receives the ATM cell data from other parts of the device through path 952. As discussed hereinabove, a characterization signal is generated by the characterization means 952 and provided to assign latency channel means 956 through path 954. The assign latency channel means 956, which has information about available latency paths in the receiving device, then assigns one of those latency paths to the ATM cell data. The latency channel indicator signal is transmitted to encoder 960 which codes the PTI bits of the ATM cell header with the pre-selected latency path information.

FIGS. 10A and 10B are flow diagrams illustrating operation of the first and second embodiments, respectively, of the data sorter 504 during transmission mode in accordance with the present invention.

As shown in FIG. 10A, operation of the first embodiment of the data sorter 504 during transmission mode starts at decision block 1000 where, if data is received, operation continues to block 1002. At block 1002, the characterization signal is generated. Operation then continues to block 1004 where a latency path is assigned to the incoming data in accordance with the characterization signal. At block 1006, the ATM cell header is then encoded with the latency channel indicator. Operation then continues at block 1008 where the encoded data is transported out of the data sorter 504.

FIG. 10B illustrates operation of the second embodiment of the data sorter 504 during transmission mode in accordance with the present invention. As shown in FIG. 10B, if data is received at decision block 1050, operation continues to block 1052 where a characterization signal associated with the received ATM cell data is generated. Then, at block 1054, the ATM cell header is encoded with the characterization signal. Operation then continues at block 1056 where the encoded ATM cell is transported out of the data sorter 504.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of selecting one of at least two latency paths through a communications device for transporting an ATM cell over an ADSL network, the ATM cell having a data portion and a header portion, the method comprising the steps of:

receiving the ATM cell for transport over the ADSL network;

characterizing the data portion and generating a characterization signal in response;

encoding the characterization signal into a pre-selected portion of the header portion; and transmitting the ATM cell to receiver means, the receiver means having the at least two latency paths and operable to decode the characterization signal and to select one of the at least two latency paths through which to transport the ATM cell through in accordance with the characterization signal.

2. A data sorter for selecting one of at least two latency paths through a communications device for transporting an ATM cell through an ADSL network, the ATM cell having a data portion and a header portion, comprising:

means for receiving the ATM cell;

means for characterizing the data portion and for generating a characterization signal in response;

means for encoding the characterization signal into a pre-selected portion of the header portion; and means for transmitting the ATM cell through the ADSL network to receiver means, said receiver means having the at least two latency paths and operable to decode the characterization signal and to select one of the at least two latency paths through which to transport the ATM cell through in accordance with the characterization signal.

* * * * *